Aug. 25, 1959 B. T. MATTHIAS 2,901,679

FERROELECTRIC DEVICES

Filed Feb. 18, 1955

INVENTOR
B. T. MATTHIAS
BY H. O. Wright
ATTORNEY

United States Patent Office 2,901,679

Patented Aug. 25, 1959

2,901,679

FERROELECTRIC DEVICES

Bernd T. Matthias, Berkeley Heights, N.J., assignor to Bell Telephone Laboratories, Incorporated, New York, N.Y., a corporation of New York Application February 18, 1955, Serial No. 489,193

10 Claims. (Cl. 317—262)

This invention relates to electrical translation devices, including dielectric elements, which elements comprise a new class of ferroelectric crystalline materials.

Certain crystalline materials, known as "ferroelectrics," when exposed to an alternating polarizing voltage, exhibit a relationship between the electrostatic polarizing force and the resultant polarization in the direction of the applied force which is similar to the hysteresis loops exhibited by magnetic materials. In the prior art, a limited number of crystalline materials have been known to exhibit ferroelectric properties. Among the best known of these are, for example, Rochelle salt, potassium dihydrogen phosphate, ammonium lithium tartrate monohydrate, potassium niobate, and barium titanate.

The present invention adds a new class of ferroelectric materials which includes guanidinium aluminum sulphate hexahydrate and numerous related compounds of guanidine, as will be set forth in detail hereinafter.

The ferroelectric properties of various species of the prior art materials mentioned serve as the bases for a number of important practical devices including nonlinear capacitors, dielectric amplifiers, and memory elements for use in various types of storage, switching, and computer systems.

Of the prior art materials mentioned, barium titanate is the only one which has a suitable hysteresis characteristic over the usual range of operating temperatures for practical applications of the types described hereinafter. Moreover, barium titanate has proved to be particularly suitable for use in memory devices, because of its low coercive force, its high spontaneous polarization, and the approximately rectangular form of its hysteresis loop, which is characterized by a high ratio between the slopes of its steep and flat portions.

However, a number of problems are encountered in systems utilizing memory elements comprising barium titanate crystals. It has been found, for example, that the high initial values of polarization impressed on the elements tend to decay significantly, thereby affecting the stability of the recorded signals.

Furthermore, the high piezoelectric activity of barium titanate, while in certain instances advantageous, proves to be disadvantageous in storage applications, since the electrode contacts are thereby rendered unduly sensitive to surface variations. Moreover, barium titanate has a relatively high dielectric constant which renders it particularly sensitive to perturbations caused by thin layers of occluded gas and other impurities lying between the crystal surface and the attached electrodes.

Furthermore, inasmuch as barium titanate is not water-soluble, the preparation of crystals suitable for memory circuit usage requires heating critical proportions of the ingredients, together with a fluxing agent, to relatively high temperatures, and subsequently cooling and processing the derived crystals through a series of specific steps. Additional steps, which include in some cases a fine degree of detail, are required to cut the crystals to the required size, orient them electrically, and apply electrodes suitable for various types of circuit applications. This is particularly a factor in the case of those applications utilizing relatively high voltage pulses, since the spontaneous polarization of barium titanate crystals is so high that inconveniently minute crystals and electrode attachments are required. Moreover, the high spontaneous polarization which characterizes barium titanate can be disadvantageous in certain further respects, such as increasing the tendency to dielectric breakdown at the interface between barium titanate and contiguous system components.

Accordingly, it is the general object of the present invention to provide improved ferroelectric circuit elements.

A more specific object of the invention is to provide ferroelectric circuit elements characterized by high operating stability.

A further object of the invention is to provide ferroelectric circuit elements which are simple to prepare and process.

These and other objects of the present invention are realized in ferroelectric circuit elements comprising one or more crystalline materials belonging to a new class of ferroelectrics. On the basis of experiments so far conducted, the most important member of this new class is known as guanidinium aluminum sulphate hexahydrate, $CN_3H_6Al(SO_4)_26H_2O$.

The above specifically-identified new ferroelectric material crystallizes in the form of short, transparent hexagonal prisms. Examination of these prisms and crystals of the disclosed related materials reveals that they are trigonal, that is, are characterized by three-fold symmetry on the hexagonal base planes. The direction of spontaneous polarization is perpendicular to the base planes of the prisms. Although the material per se has been known for some years, the present inventor has recently discovered that guanidinium aluminum sulphate hexahydrate is strongly ferroelectric within a range of temperatures extending from the liquefaction temperature of nitrogen, i.e., $-190°$ centigrade, to about 100 degrees centigrade, at which point the water of crystallization tends to evaporate, and the crystal tends to decompose.

Although the spontaneous polarization which characterizes guanidinium aluminum sulphate hexahydrate is only about $\frac{1}{75}$ that of barium titanate, with respect to coercive force and general form of hysteresis characteristic the former compares favorably with the latter for many storage and memory circuit applications. Coupled with this, the new material is also definitely superior to barium titanate, in that the impressed polarization remains stable for long periods without any appreciable decay.

Moreover, a particular feature of guanidinium aluminum sulphate hexahydrate is the relatively lower saturation polarization which it exhibits. This has a number of advantages for specific applications. For example, it enables the use of larger crystal elements and electrode platings which are simpler and more convenient to construct and process. Furthermore, this feature reduces the incidence of dielectric breakdown across thin layers of impurities which become occluded between the ferroelectric element and contiguous circuit elements.

Another feature of particular interest of the ferroelectric material of the present invention is its low, small-signal, dielectric constant which is about one-tenth that of barium titanate. This leads to more stable operation, since a smaller proportionate potential drop appears across impurity films between attached electrodes and the ferroelectric surfaces, thereby reducing consequent distortion.

A further advantage of guanidinium aluminum sulphate hexahydrate over barium titanate and other similar prior art ferroelectrics is that the former is water-soluble, a factor which lends itself to simplicity in the preparation and processing of the crystals.

Guanidinium aluminum sulphate hexahydrate has the structure of an alum in which the monovalent guanidinium ion is substituted for the monovalent cation of the alum, and in which the water of hydration is halved. The invention in its broader aspects embraces, in addition, other analogous trigonal crystals of guanidinium compounds formed by the substitution of guanidinium for the monovalent cation in the alums, in which trivalent cations other than $$\overset{+++}{\mathrm{Al}}$$

are present, and in which the divalent anions other than $$\overset{--}{\mathrm{SO_4}}$$

are present. For the purpose of this specification and claims, alums are considered to be those compounds of the general formula $$\overset{+}{\mathrm{M}}\ \overset{+++}{\mathrm{M}}\ \overset{--}{\mathrm{R_2}}\ 12\mathrm{H_2O}$$

in which $$\overset{+}{\mathrm{M}}$$

represents a monovalent cation, $$\overset{+++}{\mathrm{M}}$$

represents a trivalent cation, and $$\overset{--}{\mathrm{R}}$$

represents a divalent anion selected from the group consisting of $$\overset{--}{(\mathrm{SO_4})}$$

$$\overset{--}{(\mathrm{SeO_4})}$$

and $$\overset{--}{(\mathrm{BeF_4})}$$

In addition to guanidinium aluminum sulphate hexahydrate, tests have indicated certain related chemical compounds, which form trigonal crystals isomorphous with guanidinium aluminum sulphate hexahydrate, to be preferred for the practice of the present invention.

These preferred compounds are hexahydrates of the double sulphates of guanidine and gallium, or chromium; and hexahydrates of the double selenates of guanidine and aluminum or gallium.

Other examples of ferroelectric elements formed from compounds of the broad class set forth above are ferroelectric elements embodying trigonal crystals of the following compounds which are isomorphous with guanidinium aluminum sulphate hexahydrate; hexahydrates of the double sulphates of guanidine and one of the following: indium, titanium, vanadium, iron, cobalt, manganese, rhodium, and iridium; and hexahydrates of the double selenates of guanidine and one of the following: indium, iron, chromium, cobalt, manganese, rhodium and iridium.

It will be noted that all of the substituents for aluminum which form variants of the initially discovered ferroelectric combine in their trivalent states. Moreover, each of these metals has an ionic radius which has been found by different workers in the field to lie roughly between the limits 0.52 and 0.94 angstrom, and are, in general, those trivalent anions which tend to form alums.

Further modifications of the compounds listed in the foregoing paragraphs may be made by the substitution of deuterium for hydrogen in the waters of crystallization, and in the guanidium ion.

The present invention also embraces ferroelectric elements consisting of mixed crystals isomorphous with guanidinium aluminum sulphate hexahydrate which are formed from combinations of two or more of the compounds listed above.

It is anticipated that guanidinium aluminum sulphate hexahydrate and isomorphous materials, such as those indicated in the foregoing lists, will find a distinctive field of utility in certain novel computer and switching applications for which known prior art ferroelectrics have been found to be unsuitable, and also in the replacement of the latter in numerous circuit combinations already well known in the art, particularly those in which greater stability and simplicity of construction are of substantial importance, and in which relatively slow switching intervals and low pulsing currents are desirable or tolerable.

For the purposes of illustration, the present invention, in one aspect, will be described with reference to ferroelectric memory units of the general type disclosed in detail by J. R. Anderson in an article entitled "Ferroelectric Storage Elements for Digital Computers and Switching Systems," Electrical Engineering, volume 71, October 1952, pages 916 through 922.

A basic memory cell of the form disclosed by Anderson consists of a small capacitor containing as its dielectric a ferroelectric material which, in accordance with the present invention, would comprise guanidinium aluminum sulphate hexahydrate or one of the disclosed materials isomorphous therewith. This capacitor is connected in series with a conventional output capacitor which is shunted by a rectifier or resistor.

During the storage interval, pulses of a given polarity are applied across the ferroelectric capacitor, leaving a remanent polarization impressed on the dielectric. During the read-out interval, pulses of the reverse polarity are applied across the polarized ferroelectric condenser, causing it to discharge, producing a pulse in the output circuit which corresponds in magnitude to the stored signal. Memory cells based on this simple principle are utilized in numerous different types of storage and counter circuits, several of which are described in detail in Anderson's above-identified article, and in each of which guanidinium aluminum sulphate hexahydrate, or one of the disclosed variants, can be substituted for barium titanate to adapt the aforesaid circuits to meet certain types of performance requirements, particularly for small signal and relatively slow switching operation.

Moreover, the materials of the present invention have been found to be particularly suited for use in a novel type of memory device in which the stored signals are retained even after repeated read-out operations. Several devices of the aforesaid type are disclosed in the following applications for patent, filed concurrently herewith and assigned to applicant's assignee: J. A. Morton, application Serial No. 489,241, now Patent No. 2,791,761, issued May 7, 1957; W. L. Brown, application Serial No. 489,149, now Patent No. 2,791,759, issued May 7, 1957; D. H. Looney, application Serial No. 489,141, now Patent No. 2,791,758, issued May 7, 1957; and I. M. Ross, application Serial No. 489,223, now Patent No. 2,791,760, issued May 7, 1957.

It is also anticipated that the novel ferroelectric materials disclosed are adaptable for numerous other uses, such as, for example, recording and reproducing systems of the type disclosed by W. P. Mason and R. N. Thurston in application Serial No. 479,208, filed December 31, 1954.

The various ramifications of the invention will be better understood from a study of the detailed description given hereinafter, taken in conjunction with the attached drawings, in which.

Guanidinium aluminum sulphate hexahydrate $$CN_3H_6Al(SO_4)_26H_2O$$

and certain disclosed crystalline materials isomorphous therewith, constitute a new distinctive group of ferroelectric materials, the most important of the other groups being exemplified by the materials listed in the earlier part of the specification. As pointed out, guanidinium aluminum sulphate hexahydrate is not new as a material, having been reported in the literature some years ago by Ferraboschi (Cambridge Philosophical Society Proceedings, volume 14, pages 471–474, 1906–08).

Guanidine, $CN_3H_5$, is an organic base of sufficient strength to absorb carbon dioxide from the air to form a carbonate. It is commercially prepared from calcium cyanamide. The chemical structure is related to urea and carbonic acid in the fashion indicated below:

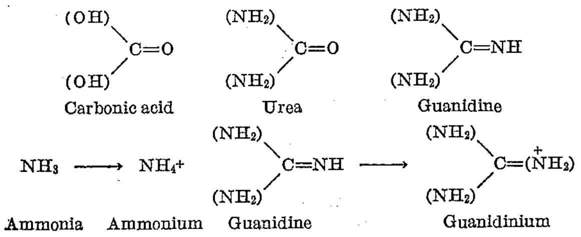

For example, if urea be regarded as the amide of carbonic acid, then guanidine may be regarded as the amidine of that acid. In its salts, guanidine forms a univalent ion in a manner similar to ammonia and the amines, the proton of an acidic hydrogen atom using the non-bonding electron pair of one of the nitrogen atoms to secure itself.

Crystals suitable for the purposes of the present invention are grown from a nutrient solution of guanidinium aluminum sulphate, which can readily be prepared by mixing stoichiometric amounts of solutions of aluminum sulphate and guanidinium sulphate in water. The latter of these is prepared by dissolving guanidinium carbonate in water and adding dilute sulphuric acid, drop by drop.

Only enough water is added to the nutrient solution to render it roughly saturated to guanidinium aluminum sulphate at the desired working temperature. The solution is first warmed slightly, say to 50° centigrade, to expel carbon dioxide.

In accordance with the established teachings for growing crystals from water solutions, the saturation temperature of the nutrient solution is then determined, and the seed crystals introduced at a temperature slightly thereabove. The solution is then reduced to slightly below the saturation temperature, and the temperature thereafter slowly reduced to room temperature. A convenient device for expediting growth of crystals of the types disclosed is described in detail in U.S. Patent 2,484,829, issued to A. N. Holden, October 18, 1949. Seed crystal strips about 5 millimeters long and 2 millimeters wide, cut along cleavage planes of a mature crystal of the desired structure, are mounted in the hollow ends of the gyrator arms of the structure described in the above Holden patent. These are moved with a reciprocating motion in the nutrient solution to promote growth to the desired size.

Figure 1:
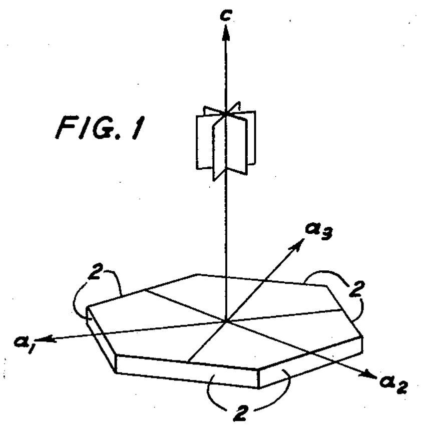
Fig. 1 shows the habit of a typical crystalline specimen of a ferroelectric material in accordance with the present invention.

As indicated in Fig. 1 of the drawings, the derived crystals are short, colorless, hexagonal prisms.

The crystals vary in size, depending on the period of growth. The hexagonal faces 2, although they have non-uniform edge dimensions in the basal planes, have a fixed angular relationship of 120° to one another. Each of the crystals has a three-fold axis of symmetry parallel to the *c* or ferroelectric axis, the latter perpendicular to the base planes, and three vertical symmetry planes through this axis which are parallel to the three horizontal axes, $a_1$, $a_2$ and $a_3$ as indicated in Fig. 1. These relationships have been confirmed by X-ray examination, and further, by etch patterns produced on the basal planes. In crystallographic terminology, the space group of these crystals is indicated as C3v(2)–P31m, using the accepted notations of Schoenflies and Hermann-Mauguin, respectively. Perfect cleavage is exhibited in the (001) or basal plane normal to the *c* axis. Observations indicate that the crystals are optically uniaxial, the optic axis coinciding with the *c* or ferroelectric axis.

Figure 2:
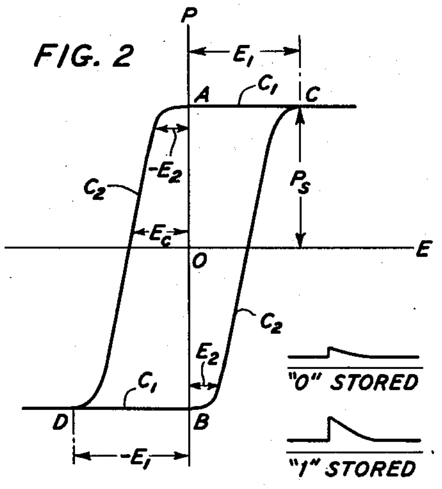
Fig. 2 shows a typical hysteresis loop characteristic of guanidinium aluminum sulphate hexahydrate.

It has been found, in crystals of the new class disclosed, that if the naturally grown faces are abraded, or fresh surfaces are generated by cleavage or etching, and an alternating voltage applied across the thickness of the crystal element, a hysteresis loop is exhibited which may take the form indicated in Fig. 2 of the drawings.

It is apparent that the hysteresis loops exhibited by ferroelectric materials such as those disclosed, when subjected to variations in an applied electric field, are similar to the hysteresis loops exhibited by ferromagnetic materials. The hysteresis loop indicated in Fig. 2 was made using a cleavage fragment of guanidinium aluminum sulphate hexahydrate 5 millimeters by 5 millimeters by .2 millimeter across the thickness of which was impressed a signal of about 2,500 volts per centimeter at 60 cycles per second through a pair of evaporated platinum electrodes fixed to the opposing major surfaces. In Fig. 2, the consequent polarization P of the subject crystal is plotted against the strength of the applied field. For example, starting from zero field and polarization at point O, the curve rises to the right, sloping asymptotically to saturation at C, producing in the subject crystal a saturated polarization, $P_s$. Slow or rapid removal of the positive field now allows the polarization to recede to a positive value at A, the distance OA thus indicating the "remanent" polarization retained by the element. To remove the remanent polarization, negative field must be applied, the magnitude of which, indicated as $E_c$ on Fig. 2, is called the "coercive force." In a manner analogous to the derivation of the hysteresis loop of a ferromagnetic material, the remainder of the complete loop CADBC is obtained.

Assuming that the hysteresis loop is of an ideal rectangular shape, all of the ferroelectric domains remain aligned after the removal of the polarizing voltage, and the maximum possible remanent polarization is attained. This is called the spontaneous polarization.

Initial quantitative measurements made at room temperature with silver paste electrodes have shown for guanidinium aluminum sulphate hexahydrate a saturation polarization $P_s$ of about .25 microcoulomb per square centimeter, and a coercive force $E_c$ of about 2,200 volts per centimeter. More recent results, using evaporated platinum electrodes on cleavage flakes which have been heated up above 70° centigrade for an interval of a few minutes and then returned to room temperature, give values for the saturation polarization of about .35 microcoulomb per square centimeter. The coercive force $E_c$ of these has been found to be about 1,500 volts per centimeter or less, which is comparable to that of barium titanate.

The dielectric constant $\epsilon_c$ in the ferroelectric direction has been found to be about 15, and the dielectric constant $\epsilon_a$ in a direction perpendicular to the ferroelectric axis, about 5. The low dielectric constant $\epsilon_c$ has been found to remain relatively constant with temperature over a large range of values extending up to 100° centigrade, at which temperature the crystal tends to decompose.

Figure 3:
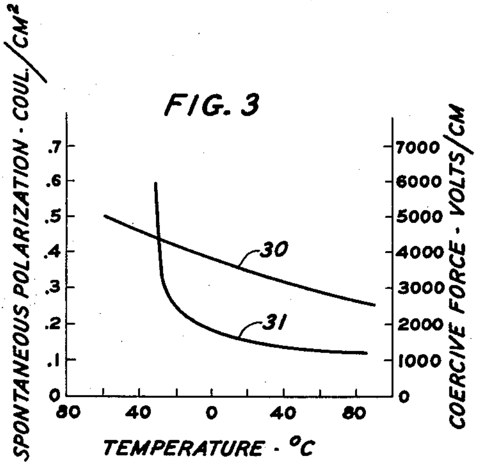
Fig. 3 is a graphical showing of spontaneous polarization and coercive field strength of guanidinum aluminum sulphate hexahydrate, plotted as functions of temperature.

The variation of some of these parameters with temperature is indicated graphically in Fig. 3 of the drawings, in which curve 30 shows successive values of spontaneous polarization in coulombs per square centimeter, and curve 31 shows successive values of coercive force in volts per centimeter, both plotted against temperature in degrees centigrade over the range −80° C. to 100° centigrade. It is seen from curve 30 that the spontaneuos polarization drops linearly from a value of $0.5\times10^{-6}$ coulombs per square centimeter at −60° centigrade to approximately $0.25\times10^{-6}$ coulombs per square centimeter at temperatures approaching 90° centigrade. From curve 31, it is seen that as the temperature is reduced below room temperature, the coercive force increases at a sharply increasing rate, approaching high values at temperatures of the order of −30° centigrade. Inasmuch as these changes have been found to be reversible, they are believed to represent true changes in spontaneous polarization and coercive force of the subject crystal, guanidinium sulphate hexahydrate.

Figure 4:
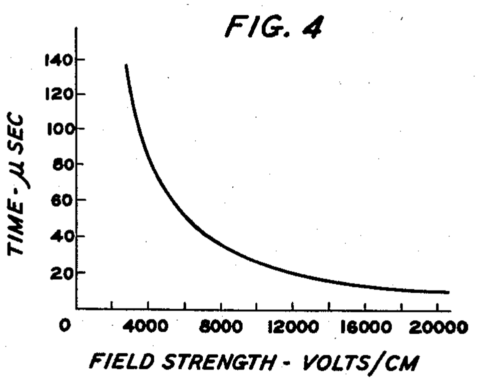
Fig. 4 is a graphical showing of the switching times of guanidinium aluminum sulphate hexahydrate, plotted as a function of applied field strength.

Fig. 4 indicates the response of the aforesaid material to applied voltage pulses, the switching intervals $t_s$ in microseconds from one state of polarization to another being plotted as a function of the applied field in volts per centimeter. At room temperature, it appears that the switching interval varies from 100 to 10 microseconds as the applied field varies from about 4,000 to 20,000 volts per centimeter. Accordingly, the switching interval can be said to vary inversely as the applied field, as in barium titanate.

As pointed out in the earlier part of the specification, in a number of instances, crystals isomorphous with guanidinium aluminum sulphate hexahydrate, which are also ferroelectric, have been produced by replacing, in principle, one atom, or group of atoms, in the crystal lattice by another of the same valence and of nearly the same size.

A brought out in the earlier part of the specification, guanidinium aluminum sulphate hexahydrate can be regarded as analogous to the alums which are double sulphates of univalent and trivalent ions, the latter containing twelve rather than six molecules of water per molecule of double sulphate. Accordingly, if the alums are defined by the general formula $$\overset{+}{M}\ \overset{+++}{M}\ \overset{--}{R_2}\cdot 12H_2O$$

in which $$\overset{+}{M}$$

represents a monovalent cation, $$\overset{+++}{M}$$

represents a trivalent cation, and $$\overset{--}{R}$$

represents a divalent anion, then the subject compounds of guanidinium, which are embraced broadly by the present invention, may be identified by a general formula $$\overset{+}{G}\ \overset{+++}{M}\ \overset{--}{R_2}\ 6H_2O$$

where G represents the monovalent guanidinium ion, $$\overset{+++}{M}$$

a trivalent cation, and $$\overset{--}{R}$$

a divalent anion. Moreover, it has been found that those trivalent cations and divalent anions which form alums can be substituted for $$\overset{+++}{M}$$

and $$\overset{--}{R}$$

respectively to form trigonal compounds isomorphous with guanidinium aluminum sulphate hexahydrate. Those trivalent cations $$\overset{+++}{M}$$

which replace aluminum in the isomorphous guanidinium compounds of the present invention have been found to have ionic radii embraced between the values 0.51 and 0.94 angstrom. Moreover, it has been found that, as in the alums, in addition to $$\overset{--}{SO_4}$$

the divalent anions $$\overset{--}{R}$$

may also assume the form $$\overset{--}{SeO_4}$$

or $$\overset{--}{BeF_4}$$

Accordingly, in addition to the initially tested ferroelectric material, guanidinium aluminum sulphate hexahydrate, further tests have indicated that the following compounds form trigonal ferroelectric crystals which are isomorphous with guanidinium aluminum sulphate hexahydrate, and which, in addition to the latter, are preferred for the practice of the present invention:

Guanidinium gallium sulphate hexahydrate
$(CN_3H_6)Ga(SO_4)_26H_2O$
Guanidinium chromium sulphate hexahydrate
$(CN_3H_6)Cr(SO_4)_26H_2O$
Guanidinium aluminum selenate hexahydrate
$(CN_3H_6)Al(SeO_4)_26H_2O$
Guanidinium gallium selenate hexahydrate
$(CN_3H_6)Ga(SeO_4)_26H_2O$ In addition, other examples of ferroelectric elements falling within the scope of the present invention are those ferroelectric elements embodying trigonal crystals of the following compounds which are isomorphic with guanidinium aluminum sulphate hexahydrate:

Guanidinium indium sulphate hexahydrate
$(CN_3H_6)In(SO_4)_26H_2O$
Guanidinium titanium sulphate hexahydrate
$(CN_3H_6)Ti(SO_4)_26H_2O$
Guanidinium vanadium sulphate hexahydrate
$(CN_3H_6)V(SO_4)_26H_2O$
Guanidinium iron sulphate hexahydrate
$(CN_3H_6)Fe(SO_4)_26H_2O$
Guanidinium cobalt sulphate hexahydrate
$(CN_3H_6)Co(SO_4)_26H_2O$
Guanidinium manganese sulphate hexahydrate
$(CN_3H_6)Mn(SO_4)_26H_2O$
Guanidinium rhodium sulphate hexahydrate
$(CN_3H_6)Rh(SO_4)_26H_2O$
Guanidinium iridium sulphate hexahydrate
$(CN_3H_6)Ir(SO_4)_26H_2O$
Guanidinium indium selenate hexahydrate
$(CN_3H_6)In(SeO_4)_26H_2O$
Guanidinium iron selenate hexahydrate
$(CN_3H_6)Fe(SeO_4)_26H_2O$
Guanidinium chromium selenate hexahydrate
$(CN_3H_6)Cr(SeO_4)_26H_2O$
Guanidinium cobalt selenate hexahydrate
$(CN_3H_6)Co(SeO_4)_26H_2O$
Guanidinium manganese selenate hexahydrate
$(CN_3H_6)Mn(SeO_4)_26H_2O$
Guanidinium rhodium selenate hexahydrate
$(CN_3H_6)Rh(SeO_4)_26H_2O$
Guanidinium iridium selenate hexahydrate
$(CN_3H_6)Ir(SeO_4)_26H_2O$
Guanidinium aluminum fluoberyllate hexahydrate
$(CN_3H_6)Al(BeF_4)_26H_2O$ As pointed out earlier, ferroelectric elements including trigonal mixed crystals isomorphous with guanidinium aluminum sulphate hexahydrate which are formed from various combinations of the materials listed above are also embraced within the scope of the present invention.

Moreover, compounds of the groups mentioned have been found to exhibit little change in their ferroelectric properties when hydrogen nuclei (protons) are replaced with deuterium nuclei (deuterons).

As pointed out in the earlier portion of the specification, ferroelectric memory circuits of several types, in which the new ferroelectric crystalline materials herein disclosed can be substituted for prior art materials and will operate to advantage, are shown in detail in the article entitled "Ferroelectric Storage Elements for Digital Computers and Switching Systems" by J. R. Anderson, identified in the earlier portion of the specification. To illustrate the uses of the present invention, a basic ferroelectric memory circuit such as disclosed by Anderson is shown in Fig. 5 of the drawings.

Figure 5:
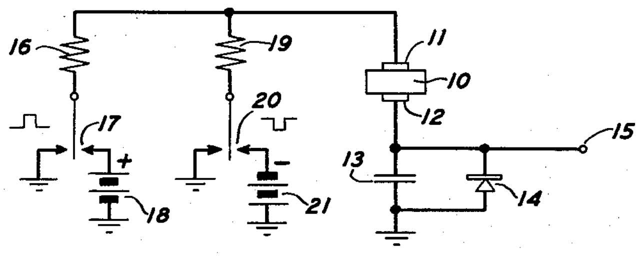
Fig. 5 shows in a schematic diagram, a basic memory cell including as its active element a crystal of guanidinium aluminum sulphate hexahydrate or an isomorphous material.

Referring now to Fig. 5, there is shown the schematic diagram of a basic memory device which may function, for example, for the storage of the binary digits "1" and "0." In accordance with the present invention, this device comprises a crystalline element 10 which may consist of guanidinium aluminum sulphate hexahydrate or any of the variants listed. The element 10 is preferably a basal cleavage element, or one having a surface of the same orientation produced by abrading or etching. Typical dimensions are 5 mils thick and surface dimensions of about ¼ by ⅛ inch. To opposite sides of the crystal element 10 are affixed electrode plates 11 and 12 which may, for example, comprise adherent spots of silver paste of 50 mils diameter, which are painted on and air-dried in a manner well known in the art. Alternatively, evaporated electrodes, or any of the types well known as ferroelectric contacts, may be used. The electrode contact 12 is connected in series with the conventional capacitor 13, the latter having a value of, say, 0.05 microfarad. A diode 14, suitably of germanium or copper oxide, is connected across capacitor 13. The lower terminal of the capacitor 13 is connected to ground, as shown.

Positive and negative pulses needed for the operation of the device are supplied to the crystal by momentarily closing switches 17 and 20 to the potential sources 18 and 21 respectively. Assuming that a positive pulse $E_1$ has been applied initially to drive the crytal to its saturation polarization, $P_s$, when the initial voltage returns to 0, no charge remains on the ferroelectric capacitor terminals 11 and 12. However, the remanent polarization OA persists within the crystal as indicated in Fig. 2 of the drawings. This condition represents the digit "0," since it is apparent that a positive read-out pulse would produce only a small pulse in the output, as indicated in Fig. 2.

Assume that a negative pulse equal to $-E_1$ is applied by the switch 20 across the crystal 10, and returned to zero. Upon cessation of the pulse, a negative polarization OB is present in the crystal 10. This represents the digit "1." To read out this digit, a positive pulse is applied through the switch 17 to reverse the polarization of crystal 10 from condition B on the hysteresis loop shown in Fig. 2 to condition C, and thence to condition A upon cessation of the read-out pulse. This causes a larger positive voltage pulse to appear at the output terminal 15.

Referring again to Fig. 2 of the drawings, it can be stated that the fundamental requirement for a material suitable for a pulse storage system, such as that basically described, is that the voltages $\pm E_1$ required to saturate the storage element should not be too high. However, when the ferroelectric material is in either state A or B on the hysteresis loop indicated in Fig. 2, the application of voltage pulses $\pm E_2$ will not be sufficiently high to change the final state of the material. This implies that the hysteresis curve be substantially rectangular in form, having a portion of low slope $C_1$, corresponding to voltage of $\pm E_1$ or less, and a rather abrupt transition to the much steeper slope $C_2$, for voltages above $\pm E_1$. The capacitance of a single ferroelectric memory cell, which is represented by the slope of the hysteresis curve at any point, will thus always remain at a low value $C_1$ when positive or negative pulses $E_2$ volts high are applied. However, when positive or negative pulses $E_1$ volts high are applied in a direction to reverse the internal or stored pulses, the polarization state of the ferroelectric material will pass from a low slope or capacitance region $C_1$ to a high slope or capacitance $C_2$, and then on to a low capacitance region $C_1$ near saturation.

Table I, which follows, lists some of the parameters of guanidinium aluminum sulphate hexahydrate, which render it suitable for use in memory elements of the type described with reference to Fig. 5. Comparisons are made with so-called "C" domain single crystals of barium titanate, prepared in the manner disclosed in application Serial Number 344,373, filed by J. P Remeika, March 24, 1953. It will be noted, particularly, that the coercive force is comparable to that of $BaTiO_3$, that the spontaneous polarization is low compared to that of barium titanate, and shows practically no decay, being the same as the initial spontaneous polarization. Moreover, the dielectric constant $E_c$ is also low, which has considerable advantage for certain applications, such as in memory and storage circuits of the type disclosed in Fig. 5.

*Table I*

| | Guanidinium Aluminum Sulphate Hexahydrate | C-Domain Crystal of Barium Titanate |
|---|---|---|
| Coercive Force, Volts Per Centimeter | 1,200–1,500 | 1,000 |
| Saturation Field Strength, Volts Per Centimeter | about 2,000 | 1,000–1,500 |
| Spontaneous Polarization $X-10^{-6}$, Coulombs Per Centimeter $^2$ | .35 | 26 |
| Remanent Polarization $X-10^{-6}$, Coulombs Per Centimeter $^2$ | .35 | 26 |
| Dielectric Constant $E_c$ (ferroelectric direction) | 15 | 160 |
| Switching Time (Microseconds) (At field strengths between 4,000 and 20,000 volts/cm.) | 10–100 | .3–3 |

Basic memory circuits of the type indicated in Fig. 5 employing crystals of guanidinium aluminum sulphate hexahydrate, for example, were constructed and operated successfully, utilizing 30 volt storage pulses 500 microseconds long at a repetition rate of a kilocycle. Using an output capacitor 13 of 0.05 microfarad, as stated, output pulses of 0.6 volt, representing binary "1" were obtained. Substituting a 500 ohm resistor for the condenser 13, an output pulse of 0.16 volt, 300 microseconds' duration was obtained.

No decay was noted, even after 200 hours of pulsing. When pulses of similar length and switching frequency were stored in comparable elements of barium titanate, they showed as much as twenty-five percent decay from the initial polarization after a period much less than 200 hours.

One of the advantages to be derived from the use of guanidinium aluminum sulphate hexahydrate as a circuit element is that, for the same charge flow, much larger electrodes can be tolerated. For example, in memory systems employing a ten volt storage pulse, crystal elements of guanidinium aluminum sulphate hexahydrate require an electrode of about 35 by 35 mils whereas crystal elements of barium titanate require electrodes approximately 4 by 4 mils. It is obvious that these much smaller electrodes, such as are required for barium titanate, are difficult to handle and apply.

It will be abundantly apparent from the foregoing facts and figures that the material, guanidinium aluminum sulphate hexahydrate, and disclosed variants, in addition to being applicable to the circuit indicated in Fig. 5 and the other circuits herein described, will be useful in numerous other storage and computer applications, such as disclosed by Anderson and others. Note, for example, the storage circuits disclosed in Figs. 6, 8 and 10 of Anderson's article entitled "Ferroelectric Storage Elements for Digital Computer and Switching Systems," cited in the earlier part of the specification.

Moreover, the low saturation polarization which characterized guanidinium aluminum sulphate hexahydrate has also been found to particularly adapt this material for use in several novel devices disclosed in the concurrently filed applications of J. A. Morton, W. L. Brown, D. H. Looney and I. M. Ross, identified in the early part of the specification.

The aforesaid applications relate to bistable memory devices which have the faculty of retaining stored signals substantially undiminished after repeated read-out operations. In each of the embodiments disclosed, a ferroelectric element is placed contiguously with a semi-conductor element. When the ferroelectric element has been charged with the impressed signal voltage, and the charge then removed, the remanent polarization retained by the element serves to induce an opposing charge in the semiconductor. Thus, the conductance of the semi-conductor is varied in accordance with the memory of the signal voltage impressed on the ferroelectric element. The stored signal information is read out by merely measuring the impedance across the semiconductor body.

Notwithstanding careful processing of the mating surfaces, impurity layers are found to exist at the interface between the ferroelectric and semiconductor bodies. When high voltages are applied thereacross, such as are required to impress a polarized signal on barium titanate, the impurity layer at the interface tends to break down dielectrically.

Guanidinium aluminum sulphate hexahydrate and the related materials disclosed have been found to function particularly well in memory devices of the types described in the afore-mentioned applications. This is believed due in part to the low saturation polarization, previously mentioned, which operates to reduce the possibility of dielectric breakdown across the impurity layer at the interface between ferroelectric and semiconductor elements, particularly during the interval when the charging voltage is applied to the ferroelectric.

Of all the advantages to be derived from use of the materials disclosed in the present invention, possibly the most important is their operating stability. They can be easily formed, and etched in water to the desired size. Electrodes of almost any of the types usually suitable for crystal use can be applied to their surfaces with a minimum of trouble, there being little if any problem with surface irregularities or impurity layers between the electrodes.

Moreover, it is also apparent that the disclosed ferroelectrics, guanidinium aluminum sulphate hexahydrate, and the variants listed, are suitable for still a different type of use, namely, in the recording and reproducing of speech and carrier frequency signals, in the manner disclosed, for example, in application Serial No. 479,208, filed December 31, 1954, by W. P. Mason and R. N. Thurston, now Patent No. 2,775,650, issued December 25, 1956. Other applications of the present invention will readily occur to those skilled in the art.

What is claimed is:

1. An electrical circuit element which comprises in combination a ferroelectric element including a trigonal crystalline material selected from the group of compounds consisting of the hexahydrates of the double sulphates of guanidine and at least one of the elements, aluminum, gallium, indium, titanium, vanadium, iron, chromium, cobalt, manganese, rhodium, and iridium, in their trivalent states, and the hexahydrates of the double selenates of guanidine and at least one of the elements, aluminum, gallium, indium, iron, chromium, cobalt, manganese, rhodium, and iridium, in their trivalent states, and a pair of electrodes coupled in electrical contacting relation with spaced portions of the surfaces of said ferroelectric element.

2. An electrical circuit device which includes a ferroelectric element consisting of a trigonal crystalline material of the form $CN_3H_6X(SO_4)_2$ hexahydrate, in which X is a trivalent cation selected from the group consisting of aluminum, gallium, indium, titanium, vanadium, iron, chromium, cobalt, manganese, rhodium and iridium, and electrode means intimately attached to spaced portions of the surface of said ferroelectric element.

3. An electrical circuit device which includes a ferroelectric element consisting of a trigonal crystalline material of the form $CN_3H_6X(SO_4)_2$, hexahydrate in which X is a trivalent cation characterized by an ionic radius substantially between the values 0.51 and 0.94 angstrom units, and electrode means intimately attached to spaced portions of the surface of said ferroelectric element.

4. An electrical circuit device which comprises in combination a ferroelectric element consisting of a trigonal crystalline material comprising guanidinium aluminum sulphate hexahydrate, and a pair of electrodes coupled in electrical contacting relation with spaced portions of the surfaces of said ferroelectric element.

5. An electric circuit element as defined in claim 1 wherein the ferroelectric element consists of guanidinium gallium sulphate hexahydrate.

6. An electric circuit element as defined in claim 1 wherein the ferroelectric element consists of guanidinium chromium sulphate hexahydrate.

7. An electric circuit element as defined in claim 1 wherein the ferroelectric element consists of guanidinium selenate hexahydrate.

8. An electric circuit element as defined in claim 1 wherein the ferroelectric element consists of guanidinium vanadium sulphate hexahydrate.

9. An electrical memory device which comprises in combination a trigonal crystalline ferroelectric element comprising guanidinium aluminum sulphate hexahydrate modified in that some of the atoms of aluminum in the crystal lattice are replaced by atoms from the group of elements gallium, indium, iron, chromium, cobalt, manganese, rhodium, and iridium in their trivalent states and modified further in that some of the atoms of sulphur in the crystal lattice are replaced by atoms of selenium; and a pair of electrodes coupled in electrical contacting relation with the surfaces of said element.

10. An electrical memory device which comprises in combination a ferroelectric element of crystalline material comprising guanidinium aluminum sulphate hexahydrate in the trigonal form and a pair of electrodes coupled in electrical contacting relation with the surfaces of said element.

References Cited in the file of this patent

UNITED STATES PATENTS

| | | |
|---|---|---|
| 2,699,666 | Mason et al. | Feb. 16, 1954 |
| 2,717,372 | Anderson | Sept. 6, 1955 |

OTHER REFERENCES

Proceedings of the Physical Society of London V, 65A (1952), pp. 289–290.